United States Patent
Suzuki

(10) Patent No.: US 7,088,485 B2
(45) Date of Patent: Aug. 8, 2006

(54) OPTICAL SCANNER AND IMAGE FORMATION APPARATUS

(75) Inventor: Seizo Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 94 days.

(21) Appl. No.: 10/743,808

(22) Filed: Dec. 24, 2003

(65) Prior Publication Data

US 2004/0184125 A1    Sep. 23, 2004

(30) Foreign Application Priority Data

Dec. 27, 2002   (JP) ............................. 2002-381818

(51) Int. Cl.
 G02B 26/08   (2006.01)
(52) U.S. Cl. ..................................... 359/204
(58) Field of Classification Search ................ 359/204, 359/205, 216–219; 347/233–244
See application file for complete search history.

(56) References Cited

U.S. PATENT DOCUMENTS

| | | | |
|---|---|---|---|
| 5,838,479 A | * | 11/1998 | Shiraishi ..................... 359/204 |
| 6,292,285 B1 | * | 9/2001 | Wang et al. ................. 359/204 |
| 6,448,998 B1 | | 9/2002 | Suzuki et al. |
| 6,509,995 B1 | | 1/2003 | Suzuki et al. |
| 6,596,985 B1 | | 7/2003 | Sakai et al. |
| 6,606,179 B1 | | 8/2003 | Suzuki et al. |
| 6,657,761 B1 | | 12/2003 | Suzuki et al. |

FOREIGN PATENT DOCUMENTS

| | | |
|---|---|---|
| JP | 2000-036625 | 2/2000 |
| JP | 2001-004948 | 1/2001 |
| JP | 2001-010107 | 1/2001 |
| JP | 2001-033720 | 2/2001 |
| JP | 2002-278207 | 9/2002 |

* cited by examiner

*Primary Examiner*—Euncha P. Cherry
(74) *Attorney, Agent, or Firm*—Oblon, Spivak, McClelland, Maier & Neustadt, P.C.

(57) ABSTRACT

An optical scanner scans a surface of each of a plurality of latent image carriers by a corresponding light beam. The optical scanner includes a optical deflection unit that deflects and reflects light beams, the optical deflection unit having two or more surfaces that deflect and reflect the light beams in different directions, a lens that takes-in the light beams reflected from the optical deflection unit and divides the light beams into number of light beams equal to number of the image carrier, and an optical system corresponding to each image carrier, the optical system that guides the light beam output from the lens onto a surface of a corresponding one of the image carriers.

13 Claims, 7 Drawing Sheets

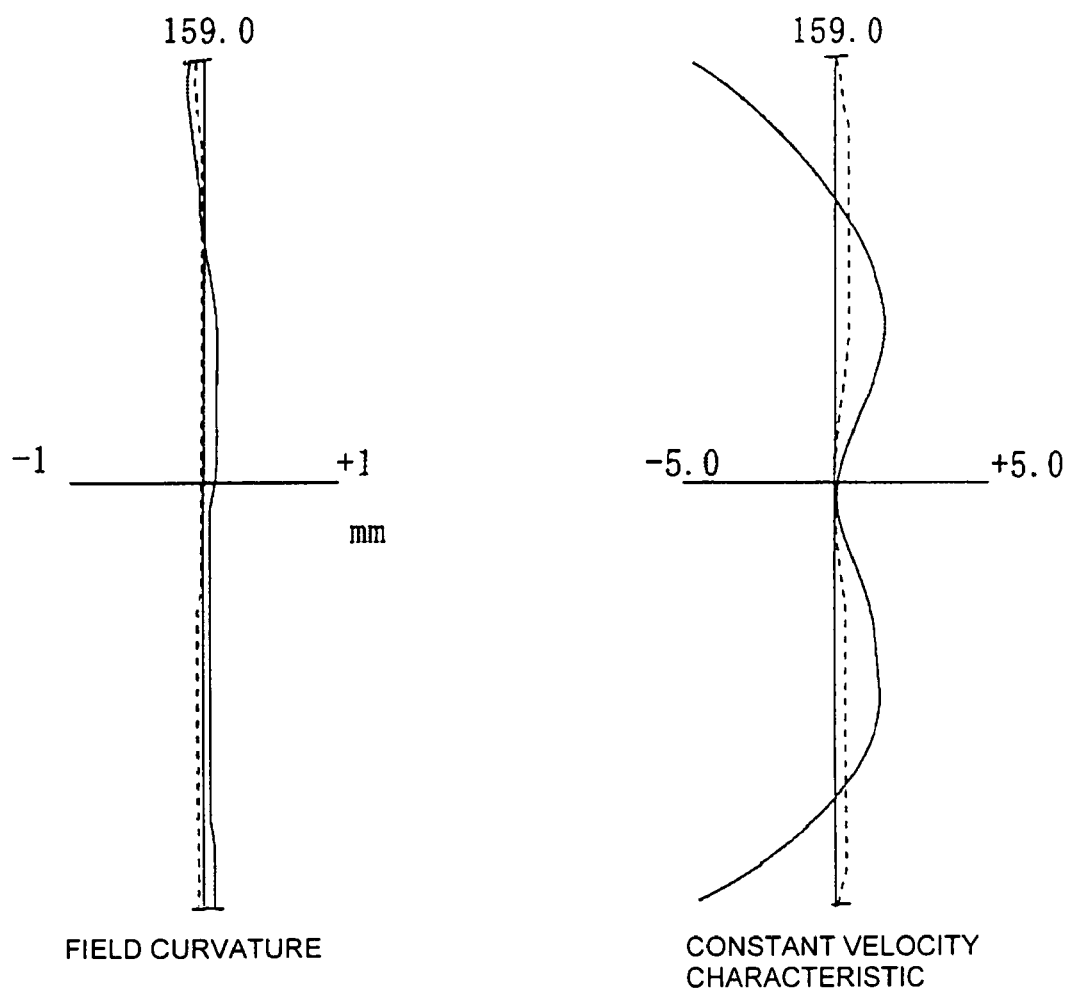

OPTICAL SCANNER AND IMAGE FORMATION APPARATUS

CROSS-REFERENCE TO RELATED APPLICATIONS

The present document incorporates by reference the entire contents of Japanese priority document, 2002-381818 filed in Japan on Dec. 27, 2002.

BACKGROUND OF THE INVENTION

1) Field of the Invention

The present invention relates to an optical scanner and a tandem-type image formation apparatus.

2) Description of the Related Art

In a tandem-type image formation apparatus, four drum-shaped photosensitive members are arranged along a transfer path of a paper, those photosensitive members are optically scanned simultaneously to form an electrostatic latent image on the respective photosensitive members, the electrostatic latent images are separately visualized by four kinds of toners, that is, yellow, magenta, cyan, and black, and the color toner images are transferred onto the same paper and superposed, to thereby obtain a color image.

Such tandem-type image formation apparatus has been put into practical use as a digital copying machine, an optical printer, and the like, wherein a color image and a monochrome image can be formed at the same speed, thereby enabling high-speed formation of a color image. On the other hand, however, if an optical scanner is provided for each photosensitive member, the image formation apparatus disadvantageously becomes big.

Moreover, if a separate optical scanner is used for each photosensitive member, the size and the like of the respective color toner images superposed on the transfer paper may become slightly different, due to a slight difference in the optical characteristics of the optical scanners, and hence "out-of-color registration" is likely to occur in the obtained color image. Furthermore, if a separate optical scanner is used for each photosensitive member, and if an optical element (plastic lens or the like) made of resin is included in the optical system, temperature becomes different for each optical element made of resin due to a temperature rise in the apparatus, at the time of continuously operating the image formation apparatus. Therefore, the optical characteristics of each resin optical element become nonuniform, and as a result, the hue of the output color image may change with the lapse of time.

One approach to overcome these problems is to share an optical deflection unit, which deflects the optical beam, by the four photosensitive members. This technique has been disclosed in, for example, Japanese Patent Application Laid-open No. 2001-4948, Japanese Patent Application Laid-open No. 2001-10107, and Japanese Patent Application Laid-open No. 2001-33720.

The image formation apparatus that includes one optical deflection unit is called as a four-drum one-sided deflection type apparatus, since the whole optical beams for optically scanning the four photosensitive members are deflected all by one side of the optical deflection unit.

The four-drum one-sided deflection type apparatus is compact since a part of the optical deflection unit and the scanning image formation optical systems in the optical scanner is shared by a plurality of photosensitive members as compared with an instance when a separate optical scanner is used for each photosensitive member.

Further, because a part of the scanning image formation optical system is shared by a plurality of optical beams, a difference in the optical characteristics in each scanning image formation optical system can be reduced. When the "shared optical element" is made of resin, even if the optical characteristics of the "shared optical element" changes due to a temperature change or the like, this change is common to "a plurality of sharing optical beams". As a result, the "out-of-color registration" and "hue change with the lapse of time" at the time of continuous operation can be effectively reduced.

FIG. 1 illustrates the main parts of the image formation apparatus of the four-drum one-sided deflection type apparatus. Four optical beams irradiated from a light source (not shown) are made to fall onto a polygon mirror PM, which is the optical deflection unit. These four optical beams are substantially parallel luminous flux, and enter from a direction substantially orthogonal to the rotation axis of the deflection reflecting surface of the polygon mirror PM, and are also deviated in the vertical scanning direction (in the direction of the rotation axis) at an equal interval.

The four optical beams reflected and deflected by the deflection reflecting surface of the polygon mirror PM pass through a lens L1, and are optically guided to photoconductive photosensitive members Y, M, C, and Bk formed in a drum shape, with the optical path thereof optically separated by mirrors M1 to M8.

The photosensitive member Y is for forming an electrostatic latent image to be visualized by the yellow toner, and the optical beams optically guided by the mirrors M1 and M5 are imaged as a light spot, by the action of lenses L1 and L2Y. The photosensitive member M is for forming an electrostatic latent image to be visualized by the magenta toner, and the optical beams optically guided by the mirrors M2 and M6 are imaged as a light spot, by the action of lenses L1 and L2M.

Likewise, the photosensitive member C is for forming an electrostatic latent image to be visualized by the cyan toner, and the optical beams optically guided by the mirrors M3 and M7 are imaged as a light spot, by the action of lenses L1 and L2C. The photosensitive member Bk is for forming an electrostatic latent image to be visualized by the black toner, and the optical beams optically guided by the mirrors M4 and M8 are imaged as a light spot, by the action of lenses L1 and L2B.

In this optical scanner, if the size of the desired optical scanning area is about 300 millimeters, and the spot diameter of the light spot formed on the respective photosensitive members to not larger than 50 micrometers, the diameter of luminous flux of the respective optical beams entering into the polygon mirror PM becomes about 5 millimeters. In this case, because it is necessary to separate the respective optical beams after having transmitted through the lens L1, the optical beams should not overlap on each other in the direction of rotation axis of the polygon mirror PM. Therefore, the deflection reflecting surface of the polygon mirror PM should be about 17 millimeters, as shown in the figure, in the direction of rotation axis.

The polygon mirror having the deflection reflecting surface of 17 millimeters in the direction of rotation axis has a large so-called "windage loss" at the time of high-speed rotation, thereby causing noise and an increase in the power consumption and fluctuation. Hence, there are many problems in speed-up of write itself.

As an optical arrangement that makes it possible to decrease the deflection reflecting surface of the polygon mirror in the direction of rotation axis, one shown in FIG. 2 can be considered. In order to avoid confusions, parts, which are considered not to be confusing, are designated by like reference signs as in FIG. 1.

In the example in FIG. 2, the four optical beams falling onto a polygon mirror PM1 are inclined with respect to the surface orthogonal to the rotation axis of the deflection reflecting surface of the polygon mirror PM1, and the angle of inclination is made to be different for each optical beam. In this case, because the four optical beams can be made to enter into the "same position in the direction of rotation axis" of the deflection reflecting surface of the polygon mirror PM1, the size of the deflection reflecting surface of the polygon mirror can be made smaller. In this polygon mirror PM1, the windage loss resulting from high-speed rotation is small, and hence high-speed rotation is possible with low power consumption, and high-speed write is also possible.

In the optical arrangement illustrated in FIG. 2, however, if an angular difference between the optical beams at the position of the deflection reflecting surface is small, it is necessary to arrange the mirrors M1 to M4 at a longer distance from the lens L1 to avoid an optical beam of one mirror falling on other mirror. As a result, the optical scanner becomes bulky.

On the contrary, if the angular difference is large, the optical scanner can be made compact, however, "skew of beams" occurs in the optical beams due to the large angle of inclination of the deflected optical beams, thereby deteriorating wave front aberration. If the wave front aberration deteriorates, it becomes difficult to achieve a small diameter of the light spot. For example, in the optical arrangement in FIG. 2, if the angle of inclination of the optical beams is about five degrees, even with the optical beams having a diameter of luminous flux of 5 millimeters in the same configuration as in FIG. 1, the spot diameter of the formed light spot is limited to about 60 micrometers, designating $1/e^2$ of the intensity of light intensity distribution as a threshold.

With the light spot having such a size, sufficient resolution and tone cannot be obtained with respect to an image having a dot density of for example 1200 dots per inch (24.1 micrometer pitch).

Separation of the deflection reflecting surface of the polygon mirror into two stages is described in Japanese Patent Application Laid-open No. 2002-278207 relating to one-drum type color image formation apparatus. Further, electrical correction of constant velocity characteristics as being performed in the exemplary embodiments in the present invention is described in Japanese Patent Application Laid-open No. 2000-36625.

SUMMARY OF THE INVENTION

It is an object of the present invention to solve at least the problems in the conventional technology.

An optical scanner according to one aspect of the present invention scans a surface of each of a plurality of latent image carriers with a corresponding light beam. This optical scanner includes an optical deflection unit that is rotatable and that deflects and reflects light beams, the optical deflection unit having two or more surfaces, along an axis of rotation of optical deflection unit, that deflect and reflect the light beams in different directions; a lens that takes-in the light beams reflected from the optical deflection unit and divides the light beams into number of light beams equal to number of the image carrier; and a bending optical system corresponding to each image carrier, the bending optical system guides the light beam output from the lens onto a surface of a corresponding one of the image carriers.

An image forming apparatus according to one aspect of the present invention includes the above optical scanner according to the present invention.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 8 illustrates a optical characteristics of the optical arrangement; and

DETAILED DESCRIPTION

Exemplary embodiments of the present invention will be explained below with reference to accompanying drawings.

Figure 3:
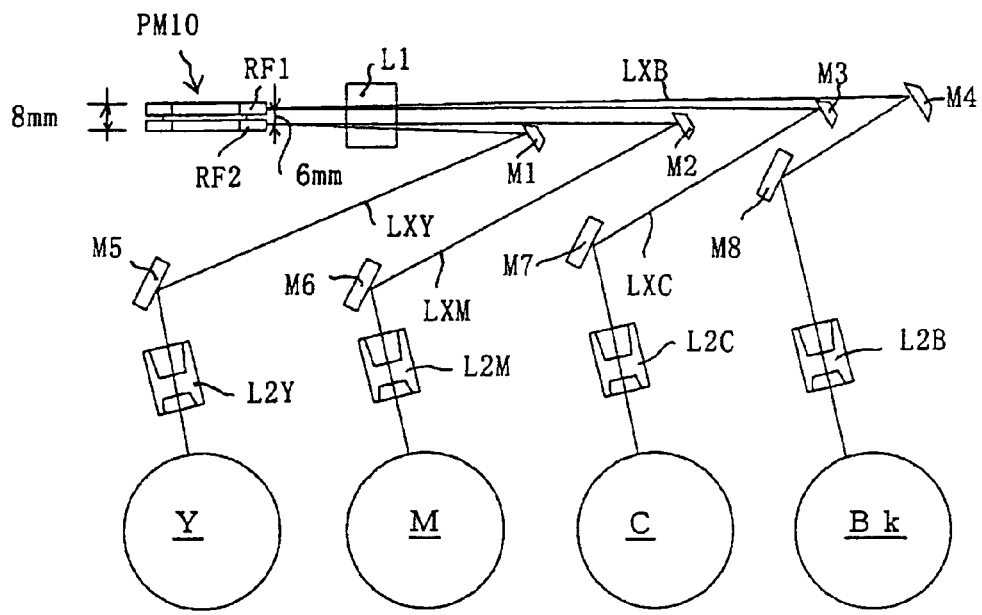
FIG. 3 illustrates an optical scanner according to an embodiment of the present invention.

FIG. 3 illustrates an optical scanner according to an embodiment of the present invention. In FIG. 3, structural elements that have same or similar structure or that perform same or similar functions as those illustrated in FIG. 1 have been provided with same reference signs as those in FIG. 1.

The optical scanner optically scans four latent image carriers, Y, M, C, and Bk, (which are photoconductive photosensitive members and formed in a drum shape). Optical scanning of the latent image carriers is performed by the single-beam method, and four optical beams for optically scanning these are deflected by a common optical deflection unit PM10.

The optical deflection unit PM10 is a polygon mirror, and the deflection reflecting surface thereof is separated into reflecting surfaces RF1 and RF2 in the direction of rotation axis. A lens L1 is used as the "common lens", and the "four sets of scanning image formation optical systems" are formed by the combination of the common lens L1, and lenses L2Y, L2M, L2C, and L3B (and mirrors M1 to M8).

Thus, this optical scanner deflects a plurality of optical beams by the deflection reflecting surface in the common optical deflection unit PM10, guides the deflected beams to a plurality of latent image carriers Y, M, C, and Bk by a plurality of sets of scanning image formation optical systems, and forms one light spot on the respective latent image carriers to thereby perform optical scanning of the respective latent image carriers. As shown in the figure, of the optical elements constituting the scanning image formation optical systems, at least the lens L1 located closest to the optical deflection unit is the "common lens" shared by the optical beams that optically scan the latent image carriers, Y, M, C, and Bk, and the deflection reflecting surfaces RF1 and RF2 in the optical deflection unit PM10 are axially separated into two reflecting surfaces.

That is, of the optical elements constituting the sets of scanning image formation optical systems, at least a lens closest to the optical deflection unit is a "common lens shared by the optical beams that optically scan the latent image carriers", and the deflection reflecting surface in the optical deflection unit is "axially separated into two or more reflecting surfaces".

As described above as "forms at least one light spot on the respective latent image carriers to thereby perform optical scanning of the latent image carriers", the optical scanner of the present invention can optically scan individual latent image carriers by a "single beam method", or by a "multibeam scanning method" using two or more light spots.

If it is assumed that the number of optical beams entering into the common optical deflection unit from the light source is N, and the number of the latent image carriers is M, there are M sets of scanning image formation optical systems (the same number as the latent image carriers). If N=M, the latent image carriers are optically scanned by the single beam method, and if N=nM, the latent image carriers are optically scanned by the multi-beam method by n optical beams.

The each set of the "scanning image formation optical systems" has image formation optical elements (such as lenses and imaging mirrors) for condensing the optical beams deflected by the common optical deflection unit to the corresponding latent image carrier, and an optical path separation mirror for separating the optical path of the optical beams and guides the separated beams to the corresponding latent image carrier. Of the image formation optical elements, a lens arranged closest to the optical deflection unit on the optical path is the "common lens" shared by the N optical beams.

The "optical deflection unit" is one of a type that reflects and deflects the optical beam by the deflection reflecting surface. The polygon mirror can be used therefor preferably, and also a type of "rotating the deflection reflecting surface", such as a rotating single-face mirror and a rotating two-face mirror, and a type of "swinging the deflection reflecting surface" such as a galvano mirror can be used.

In the above explanation, the "axis of the deflection reflecting surface" relating to the optical deflection unit refers to a "rotation axis of the deflection reflecting surface" in the type of rotating the deflection reflecting surface, or a "swinging axis of the deflection reflecting surface" in the type of swinging the deflection reflecting surface, and the direction of these axes is the "axial direction of the deflection reflecting surface".

Since the deflection reflecting surfaces RF1 and RF2 in the optical deflection unit PM10 are separated into two stages, the "portion to which the incident optical beams are not applied" can be lightened, and as a result, the weight of the whole polygon mirror is reduced, and the windage loss resulting from the rotation can be effectively reduced, thereby enabling suppression of noise resulting from high-speed rotation and reduction of power consumption and fluctuation.

It has been mentioned above that the deflection reflecting surface of the optical deflection unit is separated into two surfaces, but the deflection reflecting surface may be separated into four stages, corresponding to the four optical beams that optically scan the latent image carriers Y, M, C, and Bk.

Of the optical beams that optically scan the latent image carriers Y, M, C, and Bk, optical beams LXM and LXC that optically scan the latent image carriers M and C are "orthogonal incident beams" that are orthogonal to the axial direction of the deflection reflecting surfaces RF1 and RF2, and optical beams LXY and LXB that optically scan the latent image carriers Y and Bk are "oblique incident beams" that are oblique to the face orthogonal to the axial direction of the deflection reflecting surfaces RF1 and RF2.

That is, the optical beams reflected from the common optical deflection unit PM10 are formed of orthogonal incident beams LXM and LXC that enter orthogonally to the axial direction of the deflection reflecting surfaces RF1 and RF2, and oblique incident beams LXY and LXB that are obliquely with respect to the face orthogonal to the axial direction thereof.

In the example described below, an "angle of inclination formed between the oblique incident beams LXY and LXB and the face orthogonal to the axial direction of the deflection reflecting surfaces" is set to two degrees. With this level of inclination, the spot diameter of the light spot can be reduced to the level of not larger than 50 micrometers, without causing large deterioration in the wave front aberration due to the skew of luminous flux. Further, since the optical beams LXY and LXB are the "oblique incident beams", the deflected optical beams can be "separated in the vertical scanning direction sufficiently" by the mirrors M1 to M4.

Figure 1:
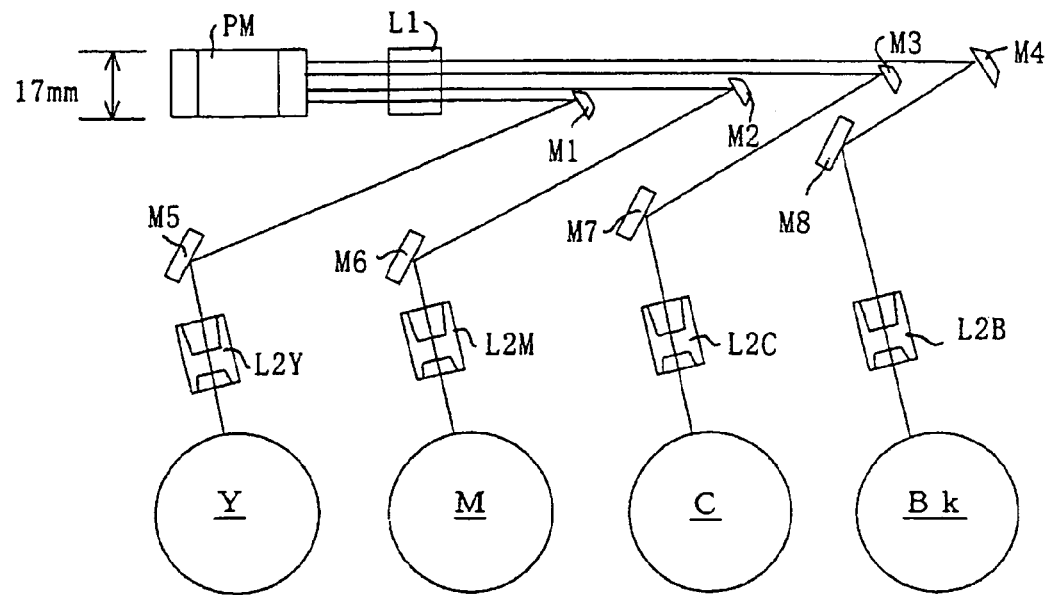
FIG. 1 illustrates an example of a conventional four-drum one-sided deflecting type optical scanner.
Figure 2:
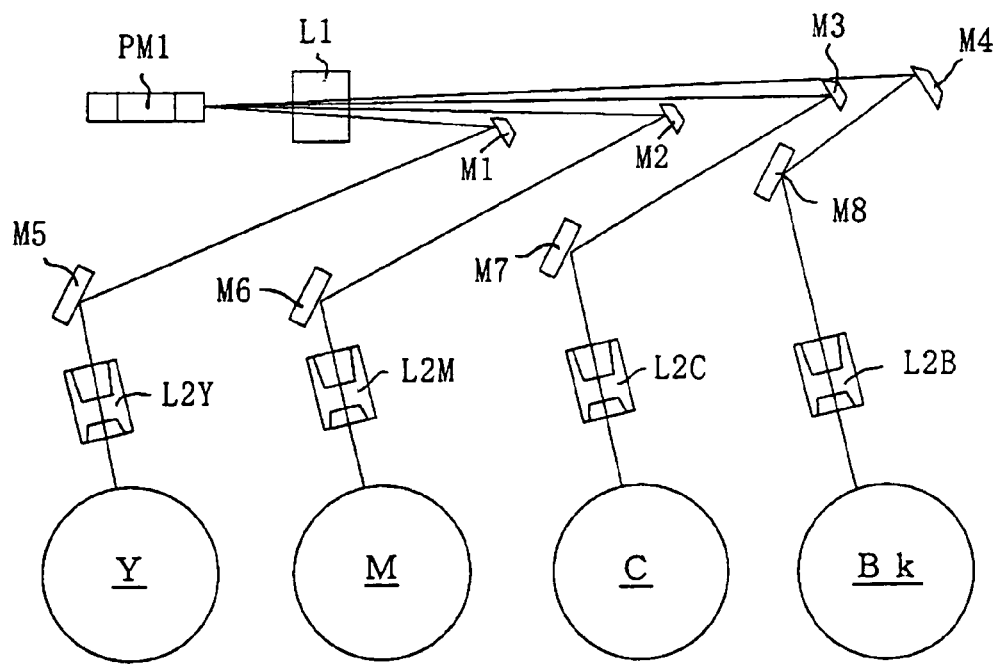
FIG. 2 illustrates another example of a conventional four-drum one-sided deflecting type optical scanner.

By having such an optical arrangement, in this example, the height of the polygon mirror PM10 in the direction of rotation axis can be set to 8 millimeters, and as a result, the polygon mirror MP10 can be made considerably thin with respect to the height, 17 millimeters, in FIG. 1, thereby facilitating the correspondence to speed-up.

In the example, an "incident position interval d, at which the oblique incident beams LXY and LXB enter into the optical deflection unit at an angle of inclination, θ, with respect to the face orthogonal to the axis of the deflection reflecting surface, is set to 6 millimeters, and a distance L between the deflection reflecting surface and an image surface is set to 370 millimeters.

Therefore, in the example, when it is assumed that θ=2, d=6 millimeters, and L=370 millimeters, 2L·tan θ+d=31.8 millimeters, and the condition:

$$10 < 2L \cdot \tan \theta + d < 40 \text{ (millimeters)}$$

is satisfied.

If the incident beam exceeds the upper limit of 40 millimeters, the spot diameter of the light spot by the oblique incident beam cannot be made as small as not larger than 50 micrometers, due to deterioration of the wave front aberration by the oblique incidence. Further, the "axial size of the deflection reflecting surface" of the optical deflection unit is likely to increase, and hence correspondence to speed-up becomes difficult. If the incident beam exceeds the lower limit of 10 millimeters, it becomes difficult to separate the luminous flux of the deflected optical beams, and "allowable misregistration in the vertical scanning direction" of the optical beams decreases.

Figure 5:
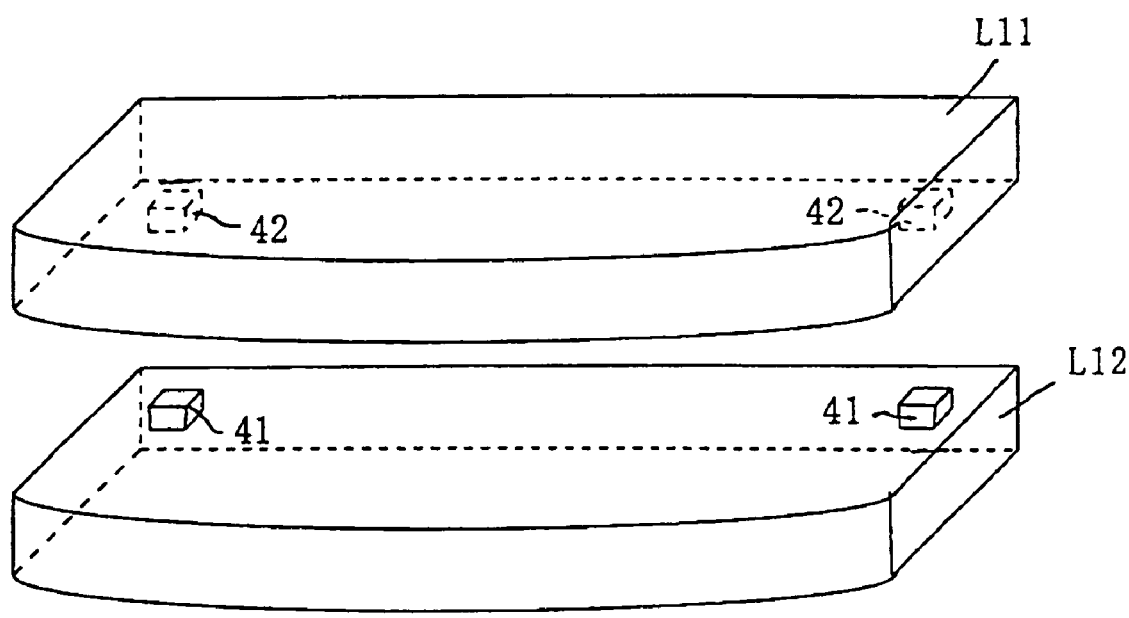
FIG. 5 illustrates one example of a multi-level lens.

In the example, the thickness of the common lens L1 in the vertical scanning direction (vertical direction in FIG. 1) is set to 15 millimeters. When a "lens thick in the vertical scanning direction" is integrally formed as a resin lens, since the thickness is large, the molding time is long, and hence productivity is low. In order to avoid this problem, it is desired that the common lens have a "multi-level lens"

configuration, as shown in FIG. 5, in which two lenses L11 and L12 are superposed in two levels in the vertical scanning direction.

By using the multi-level lens as the common lens, the thickness of the scanning lenses L11 and L12 in each level in the vertical scanning direction can be made thin, and as a result, the molding time at the time of molding can be reduced, thereby enabling improvement in the productivity. Further, since occurrence of "shrinkage" can be suppressed, highly accurate face shape can be obtained. The "superposition" of the scanning lenses L11 and L12 may be performed, as shown in the figure, by fitting relative positioning units 41 and 42 to each other, or may be integrated by bonding.

Figure 4:
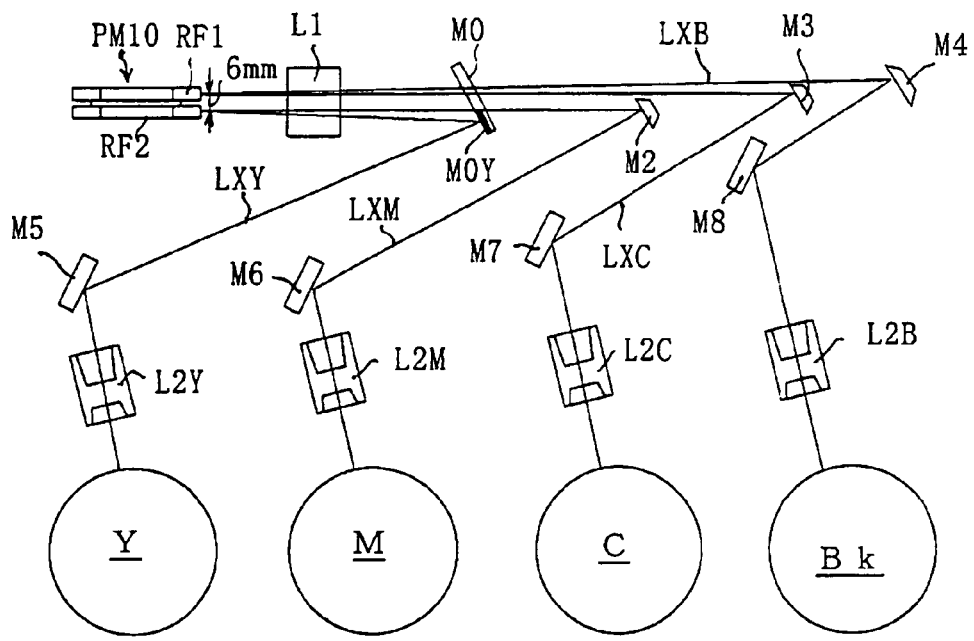
FIG. 4 illustrates an optical scanner according to another embodiment of the present invention.

FIG. 4 illustrates an optical scanner according to another embodiment of the present invention. In order to avoid confusions, parts, which are considered not to be confusing, are designated by like reference signs as in FIG. 3. In the embodiment shown in FIG. 4, an optical path separation mirror M0 is provided instead of the mirror M1 in the embodiment shown in FIG. 3.

Of a plurality of optical path separation mirrors M0 to M8 that separates the optical path of the optical beams deflected by the common optical deflection unit PM10 and having transmitted through the common lens L1, according to the corresponding latent image carrier Y, M, C, or Bk, the optical path separation mirror M0 "reflects the optical beam LXY of a plurality of deflected optical beams LXY, LXM, LXC, and LXB, and allows optical beams LXM, LXC, and LXB to transmit therethrough" (The fifth aspect).

The optical path separation mirror M0 includes a reflecting surface M0Y that reflects the optical beam LXY, and allows the other optical beams LXM, LXC, and LXB to transmit therethrough.

In the normal long mirror, the "sufficiently inside from the edge" is designated as a mirror effective portion, in order to compensate "surface sag and crack of the edge, and positioning accuracy of the optical beams". Therefore, the interval between the respective optical path separation mirrors must be increased in order to separate the optical path, and accompanying this, it is necessary to arrange the optical beams entering into the optical path separation mirrors sufficiently away from each other.

Because of the provision of the optical element M0, it is not necessary to set a large margin for surface sag and crack of the edge, and positioning accuracy of the optical beams, and hence the interval between the optical beams may, not be increased.

Because the distance from the deflection reflecting surfaces RF1 and RF2 to the separation mirror M0Y is short, and it is difficult to have a wide interval between the optical beams, such an optical element can be used only for the optical beam LXY. Needless to say, such an optical element can be used for all separation mirrors.

As in the example, if the oblique incident beams LXY and LXB are inclined by about two degrees, to enter the deflection reflecting surfaces RF1 and RF2, a considerably large bend of the scanning line of about 0.2 to 0.5 millimeter occurs on the latent image carriers Y and Bk. Such a bend of the scanning line can be reduced by performing "β tilt" for making the lenses L2Y and L2B having a power mainly in the vertical scanning direction incline to the vertical scanning direction, or "Z shift" for shifting these lenses to the vertical scanning direction.

However, only by β tilt or Z shift of the lenses L2Y and L2B, the bend of the scanning line cannot be reduced to completely zero, and hence a deviation of the scanning line that cannot be ignored of about 0.02 to 0.05 millimeter occurs between the photosensitive members Y and Bk and the photosensitive members M and C. As a result, out-of-color registration in the vertical scanning direction may occur.

Since the wave front aberration also deteriorates due to the β tilt or Z shift of the lens L2Y and the like, it gives an influence with respect to reduction in size of the diameter of the light spot.

By using a biased surface whose tilt angle changes corresponding to the image height instead of performing β tilt or Z shift, or together with β tilt or Z shift, the bend of the scanning line can be fundamentally reduced to zero completely, and the occurrence of out-of-color registration in the vertical scanning direction can be effectively reduced or prevented. Further, deterioration of the wave front aberration becomes also very small, thereby enabling realization of a light spot having a diameter less than 50 micrometers.

The biased surface provided as the lens surface of the scanning lenses L2Y and L2B can be expressed by the following equation:

$$Xt(Y, Z) = (F_0 + F_1 \cdot Y + F_2 \cdot Y^2 + F_3 \cdot Y^3 + F_4 \cdot Y^4 + F_5 \cdot Y^5 + F_6 \cdot Y^6 + \ldots)Z$$

where Xt is the shape by the tilt component in a depth. Y is a coordinate in the horizontal scanning direction, and Z is a coordinate in the vertical scanning direction.

By optionally setting tilt coefficients $F_1$, $F_2$, $F_3$, ..., the tilt angle can be changed corresponding to the image height. By adopting such a biased surface, bend of the scanning line can be favorably corrected, thereby enabling realization of a small diameter of the light spot.

Figure 6:
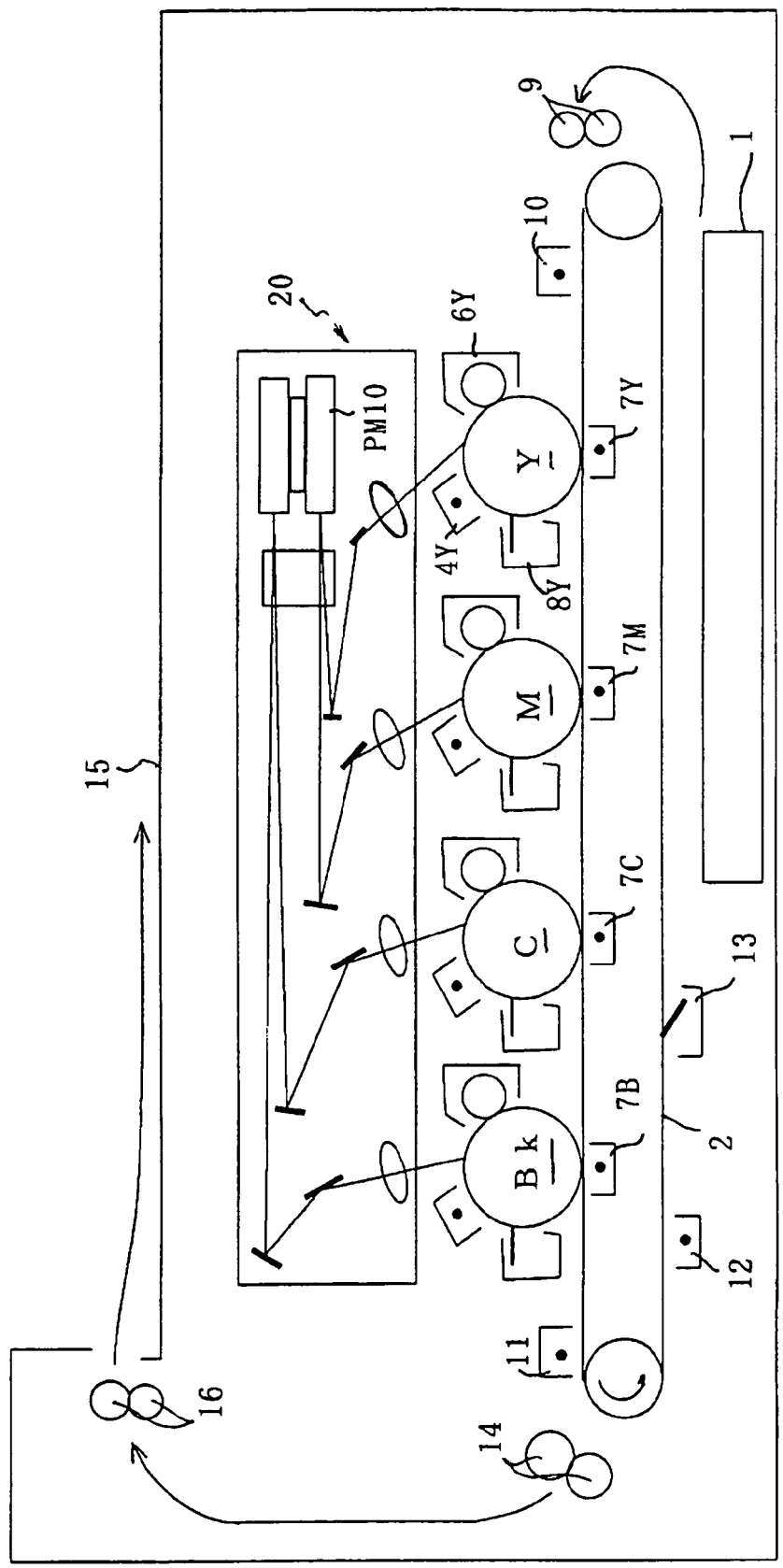
FIG. 6 illustrates an image formation apparatus according to an embodiment of the present invention.

FIG. 6 illustrates an image formation apparatus according to an embodiment of the present invention. This image formation apparatus is a tandem-type color image formation apparatus of the four-drum one-sided deflecting method.

A paper feed cassette 1 that stores the "transfer paper", being a sheet-form recording medium, is arranged on the lower part of the apparatus, and a transfer belt 2 is spanned horizontally above the paper feed cassette 1. A photosensitive member Y for yellow, a photosensitive member M for magenta, a photosensitive member C for cyan, and a photosensitive member Bk for black are respectively arranged, as shown in the figure, at an equal interval, on the transfer belt 2.

The photosensitive members Y, M, C, and Bk are respectively formed in a drum shape having the same diameter, and process members are arranged around these photosensitive members according to the electrophotographic process. For example, a charging charger 4Y, development apparatus 6Y, a transfer charger 7Y, and a cleaning device 8Y are arranged, surrounding the photosensitive member Y. Other photosensitive members M, C, and Bk are likewise.

On the periphery of the transfer belt 2, resist rollers 9 and belt-charging charger 10 are provided on the upstream side of the photosensitive member Y, a belt-separating charger 11 is provided on the downstream side of the photosensitive member Bk, and a discharging charger 12 and a cleaning device 13 are provided on the lower face of the belt. Fixing apparatus 14 is provided on the left side of the belt-separating charger 11, to form a transfer line leading to a paper catch tray 15 via paper discharge rollers 16.

The part indicated by reference sign 20 in FIG. 6 is the optical scanner explained in FIG. 3, wherein the photosensitive members Y to Bk are optically scanned by the optical beams deflected by the polygon mirror PM10 between the charging charger and the development apparatus. In the full color mode (plural color mode), optical scanning by the optical scanner 20 is performed based on signals for the respective color images of yellow, magenta, cyan, and black, with respect to the photosensitive members Y, M, C, and Bk, to thereby form an electrostatic latent image.

In other words, when taking a toner image by the yellow toner as an example, the photosensitive surface of the photosensitive member Y is uniformly charged by the charging charger 4Y, and an electrostatic latent image to be developed by the yellow toner is written thereon by the optical scanner 20. The electrostatic latent image is developed by the development apparatus 6Y to thereby form a yellow toner image.

Likewise, a magenta toner image, a cyan toner image, and a black toner image are respectively formed on the photosensitive members M, C, and Bk.

The transfer paper, being a sheet-form recording medium, is fed from the paper feed cassette 1, and put on the transfer belt 2 at a good timing by the resist rollers 9. At this time, the transfer belt 2 is charged by the belt-charging charger 10, and electrostatically attracts the transfer paper. The electrostatically attracted transfer paper is carried at an equal velocity, accompanying the counterclockwise rotation of the transfer belt 2. During this transport, the yellow toner image is transferred onto the transfer paper from the photosensitive member Y by the transfer charger 7Y, the magenta toner image is transferred thereon from the photosensitive member M by the transfer charger 7M, the black toner image is transferred thereon from the photosensitive member Bk by the transfer charger 7B, sequentially. The respective photosensitive members after the toner image transfer are cleaned by the cleaning device 8Y and the like, thereby removing the residual toner and paper dust.

In this manner, the respective yellow, magenta, cyan, and black color toner images are superposed on the transfer paper, to form a color image. The transfer paper carrying this color image thereon is electrically neutralized by the discharging charger 12, and separated from the transfer belt 2. After the color image is fixed by the fixing apparatus 14, the transfer paper is discharged onto the paper catch tray 15 by the paper discharge rollers 16. The transfer belt 2 after the separation of the transfer paper is neutralized by the neutralization charger 12, and cleaned by the cleaning device 13.

These electrostatic latent images are developed by the corresponding color toner, respectively, to become toner images, and sequentially transferred onto the transfer paper, which is electrostatically attracted to and carried on the transfer belt 2, and superposed thereon, and fixed as a full color image, then the transfer paper is discharged In the black mode (monochrome mode), the photosensitive members Y, M, and C, and the process members thereof are in the non-operating state, and an electrostatic latent image is formed only with respect to the photosensitive member Bk, by optical scanning of the optical beams by the optical scanner, based on the image signal for black.

This electrostatic latent image is developed by the black toner, to form a toner image, which is transferred onto the transfer paper electrostatically attracted to and carried on the transfer belt 2, and fixed as a black monochrome image, then the transfer paper is discharged.

In other words, the image formation apparatus in FIG. 6 is image formation apparatus that deflects a plurality of optical beams by a deflection reflecting surface in a common optical deflection unit, guides the deflected beams to a plurality of latent image carriers Y to Bk by a plurality of sets of scanning image formation optical systems, forms a light spot on the respective latent image carriers, forms an electrostatic latent image on the respective latent image carriers by performing optical scanning of the respective latent image carriers, visualizes these electrostatic latent images with a color toner different from each other, and transfers the obtained respective color toner images onto a common sheet-form recording medium, to thereby perform image formation. As the optical scanner that optically scans the latent image carriers Y to Bk, the one according to any one of the first to the seventh aspect is used. Further, the number of the latent image carriers is four, and the electrostatic latent images formed on the respective latent image carriers Y to Bk are respectively developed by four color toners of magenta, cyan, and yellow, added with black, to perform color image formation.

Figure 7:
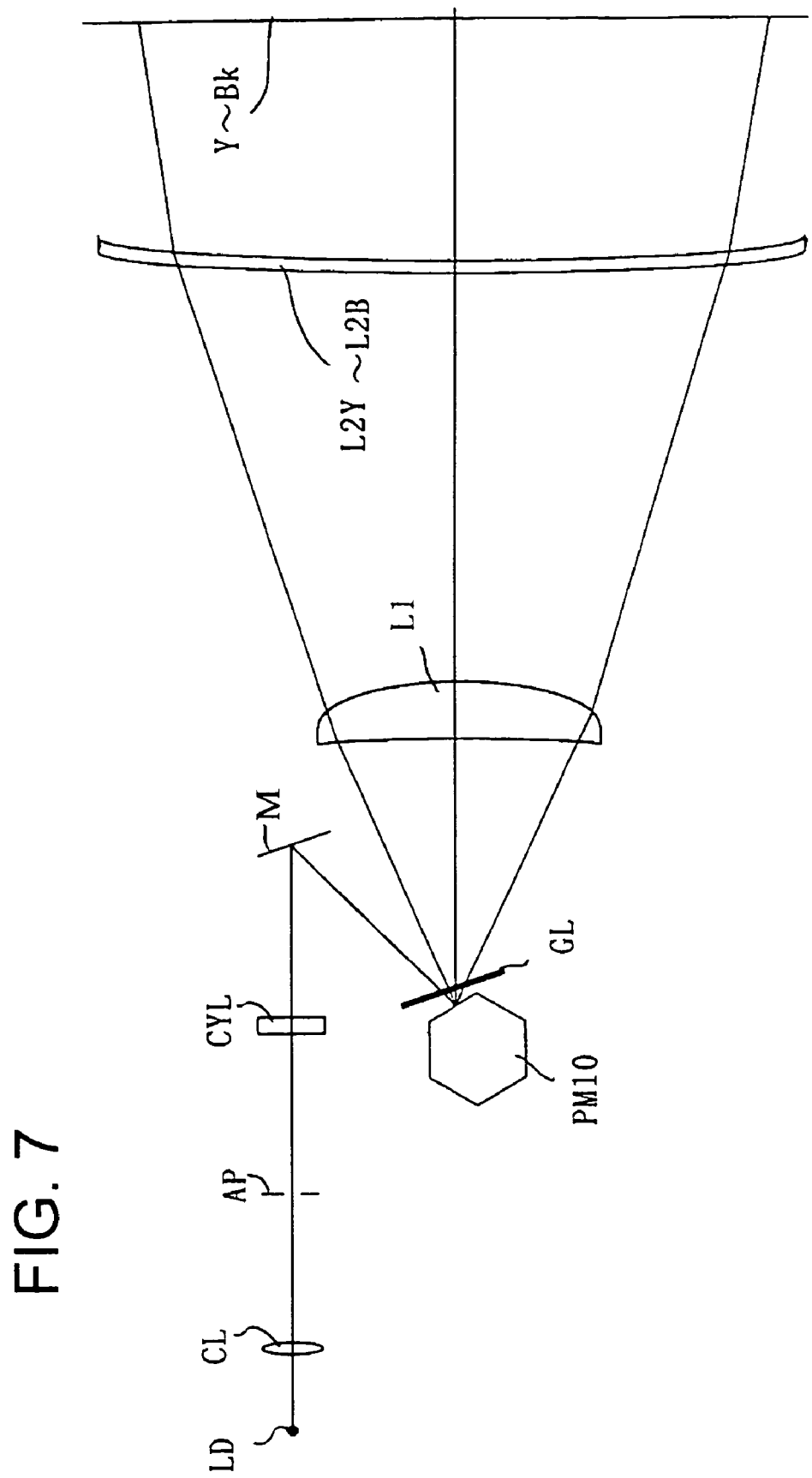
FIG. 7 illustrates an optical arrangement in the optical scanner according to the present invention.

A specific example of the optical scanner will be explained. This example is a specific example of the embodiment explained with reference to FIG. 3, and the optical arrangement on the optical path from each light source to the latent image carriers is as shown in FIG. 7.

The optical beams emitted from a light source LD, being a semiconductor laser, are coupled by a coupling lens CL to become parallel beams, subjected to beam-forming by an aperture AP, converged in the vertical scanning direction by a cylindrical lens CYL, reflected by a mirror M and enter into the polygon mirror PM10, and are imaged as a line image long in the horizontal scanning direction at a position on the deflection reflecting surface.

Of the optical beams entering into the polygon mirror PM10 (see FIG. 3), the optical beams LXM and LXC for optically scanning the photosensitive members M and C are orthogonal incident beams, and the optical beams LXY and LXB for optically scanning the photosensitive members Y and Bk are oblique incident beams, and the angle of inclination of these oblique incident beams is two degrees.

The optical beams deflected by the polygon mirror PM10 transmit through the common lens L1, are guided to the photosensitive members Y to Bk, with the optical path thereof separated by an optical path separation mirror (not shown in FIG. 7), and condensed as a light spot on the photosensitive members by the operation of the lenses L2Y to L2B, constituting the four sets of scanning image formation optical systems together with the common lens L1, thereby to perform optical scanning.

In the table below, the meaning of reference signs is as follows:

RY: radius of curvature in the horizontal scanning direction
RX: radius of curvature in the vertical scanning direction (center of lens)
N: refractive index in the used wavelength (655 nanometers)
X: distance in the direction of optical axis.

Table 1 relates to an optical arrangement from the light source to the polygon mirror.

TABLE 1

| Surface Number | RY(mm) | RZ(mm) | X(mm) | N | Note |
|---|---|---|---|---|---|
| 0 | — | — | −3.944 | — | Semiconductor laser |
| 1 | ∞ | ∞ | 0.3 | 1.51 | Cover glass |
| 2 | ∞ | ∞ | 20.0 | — | |
| 3 | ∞ | ∞ | 4.5 | 1.6935 | Coupling lens |
| 4* | −18.486 | −18.486 | 15.0 | — | |
| 5 | ∞ | ∞ | 100 | — | Aperture |
| 6 | ∞ | 48.0 | 3.0 | 1.5168 | Cylindrical lens |
| 7 | ∞ | ∞ | 93.57 | — | |

TABLE 1-continued

| Surface Number | RY(mm) | RZ(mm) | X(mm) | N | Note |
|---|---|---|---|---|---|
| 8 | — | — | — | — | Deflection reflecting surface |

The opening width of the aperture is 5.6 millimeters in the horizontal scanning direction, and 0.64 millimeters in the vertical scanning direction.

In the above data, the surface 4* (surface on the outgoing side of the coupling lens) is a coaxial aspheric surface. The numerical data is not shown for this aspheric surface, but the wave front aberration of the optical beams emitted from the coupling lens (parallel beams) is favorably corrected.

The polygon mirror PM10 is such that the number of deflection reflecting surfaces is 6, and the inscribed circle radius is 18 millimeters. As explained in FIG. 3, the height in the direction of rotation axis is 8 millimeters, the incident position interval d of the oblique incident beams LXY and LXB with respect to the reflecting surfaces RF1 and RF2 is 6 millimeters.

Table 2 relates to an optical system arrangement between the polygon mirror PM10 and the surface to be scanned. Here, β, lateral magnification in the vertical scanning direction between the polariscope and the surface to be scanned, is 0.38.

TABLE 2

| Surface Number | RY(mm) | RZ(mm) | X(mm) | N | Note |
|---|---|---|---|---|---|
| 0 | ∞ | ∞ | 77.93 | — | Deflection reflecting surface |
| 1* | −696.8 | ∞ | 17.07 | 1.5305 | Scanning lens L1 |
| 2* | −118.882 | ∞ | 171.5 | — | |
| 3** | 2709.20 | −27.296 | 3.5 | 1.5305 | Scanning lens L2Y and the like |
| 4** | 2167.36 | −16.495 | 100.0 | — | |
| 5 | — | — | — | — | Surface to be scanned |

The distance L between the deflection reflecting surface and the image surface is 370 millimeters.

The respective surfaces provided with "*" sign have the shape in the horizontal scanning direction that is non-circular arc, and the shape in the vertical scanning direction has no curvature.

The shape of the lens face on the surface provided with "*" sign is provided by the following equation:

$$X(Y, Z) = (Cm \cdot Y^2)/\{1[1-(1+k) \cdot (Y \cdot Cm)2]\} + A_4 \cdot Y^4 + A_6 \cdot Y^6 + A_8 \cdot Y^8 + A_{10} \cdot Y^{10} + A_{12} \cdot Y^{12} + A_{14} \cdot Y^{14} + Cs(Y) \cdot Z^2/\{1+[1-(Cs(Y) \cdot Z)2]\}$$

where $Cm = 1/RY$, and $Cs(0) = 1/RZ$.

The surfaces provided with "**" sign have the shape in the horizontal scanning direction that is non-circular arc, and the radius of curvature in the vertical scanning direction changes continuously according to the lens height Y. The shape of these surfaces is provided by one obtained by expressing $Cs(Y)$ in the above equation by the following equation:

$$Cs(Y) = 1/RZ + B_1 \cdot Y + B_2 \cdot Y^2 + B_3 \cdot Y^3 + B_4 \cdot Y^4 + B_5 \cdot Y^5 + B_6 \cdot Y^6 + B_7 \cdot Y^7 + B_8 \cdot Y^8 + B_9 \cdot Y^9 + B_{10} \cdot Y^{10} + B_{11} \cdot Y^{11} + B_{12} \cdot Y^{12} +.$$

The respective coefficients are illustrated in Table 3.

TABLE 3

| | First surface | Second surface | Third surface | Fourth surface |
|---|---|---|---|---|
| RY | −696.8 | −118.88 | 2709.2 | 2167.4 |
| K | 1.1764E+02 | 2.1136E+00 | −5.5639E+23 | −9.6122E+02 |
| $A_4$ | −1.2398E−07 | 5.7148E−08 | −5.5150E−09 | −1.7564E−09 |
| $A_6$ | 3.7031E−11 | 2.8529E−11 | 3.1396E−13 | −4.5995E−13 |
| $A_8$ | 3.5715E−15 | 6.6969E−15 | 1.0070E−17 | 8.4327E−19 |
| $A_{10}$ | 2.7486E−19 | 1.2031E−18 | 2.0204E−22 | 5.3773E−22 |
| $A_{12}$ | −1.4610E−23 | 1.8696E−22 | 6.9833E−27 | 2.3714E−26 |
| $A_{14}$ | −2.5118E−26 | −8.2308E−28 | | |
| RZ | ∞ | ∞ | −27.495 | −16.495 |
| $B_1$ | — | — | — | −3.5150E−08 |
| $B_2$ | — | — | 5.2106E−06 | 5.0773E−06 |
| $B_3$ | — | — | — | −5.6045E−11 |
| $B_4$ | — | — | −1.7519E−10 | −1.8382E−10 |
| $B_5$ | — | — | — | 6.6114E−15 |
| $B_6$ | — | — | −4.8585E−15 | −1.3155E−15 |
| $B_7$ | — | — | — | −7.9660E−19 |
| $B_8$ | — | — | 3.2796E−19 | 1.3928E−19 |
| $B_9$ | — | — | — | 6.5799E−23 |
| $B_{10}$ | — | — | 2.2796E−23 | 1.6289E−23 |
| $B_{11}$ | — | — | — | −2.0341E−27 |
| $B_{12}$ | — | — | −4.2670E−28 | 1.0237E−28 |

As shown in FIG. 7, a sound-proof glass GL is provided on the casing of the polygon mirror PM10. The sound-proof glass GL has a thickness of 1.9 millimeters and a refractive index of 1.51, and is arranged with an inclination of 8 degrees with respect to the vertical scanning direction (the direction orthogonal to the page in FIG. 7).

The characteristic diagram relating to the example is shown in FIG. 8. The field curvature (the broken line indicates the horizontal scanning direction, and the actual line indicates the vertical scanning direction) is corrected quite favorably both in the horizontal scanning direction: 0.102 (−0.077 to 0.025), and in the vertical scanning direction: 0.085 (0.0069 to 0.144). In the constant velocity characteristic (the broken line indicates fθ characteristic, and the actual line indicates the linearity), since the change in the linearity is slightly as large as 5.755% (−4.598 to 1.157%), electrical correction for "shifting the phase of the pixel clock" is performed so as to correct the linearity based on the linearity data measured at the time of assembly of the optical scanner.

Figure 9A:
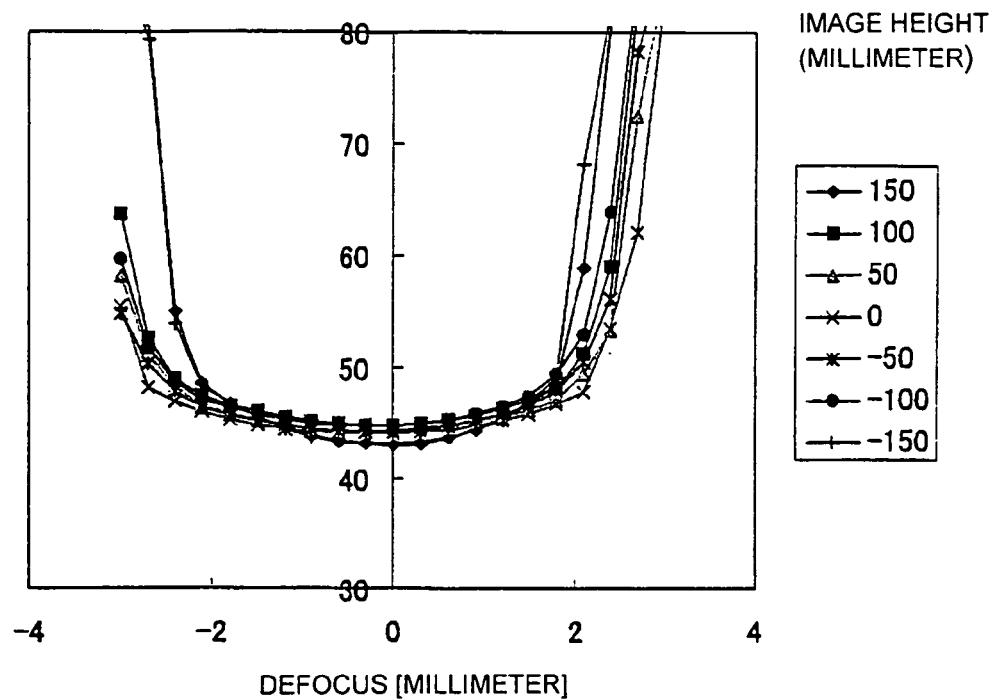
FIGS. 9A and 9B illustrate a change in spot diameter due to defocus in the horizontal and vertical directions, respectively.
Figure 9B:
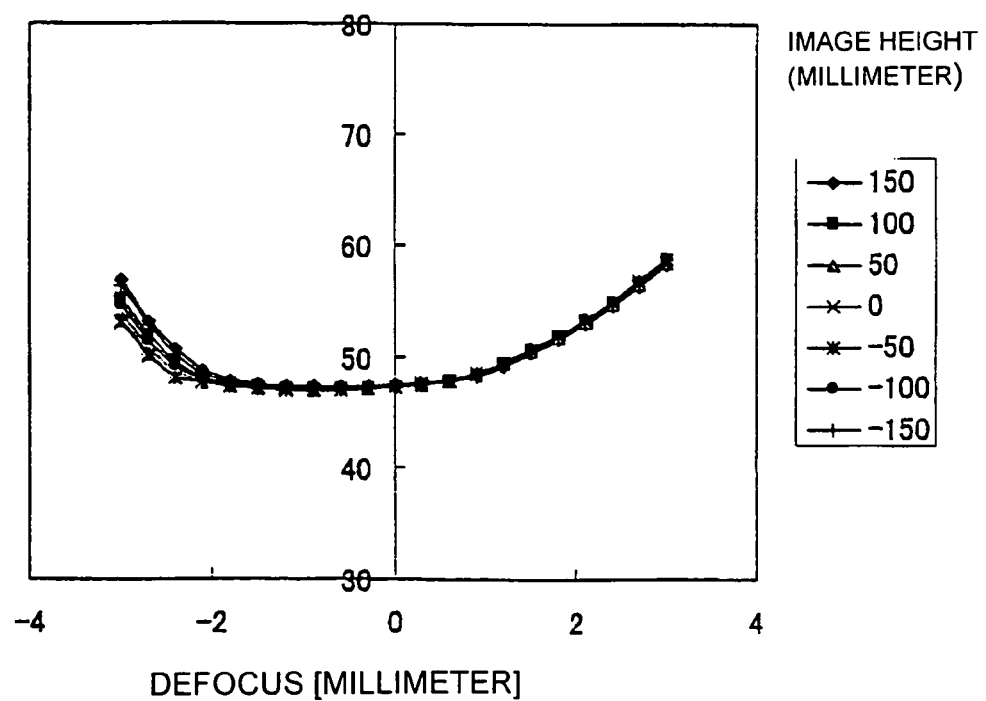

The change due to defocus (x-axis, a mechanical deviation between the imaging position of the light spot and the photosensitive face) of the spot diameter (y-axis) of the light spot on the photosensitive member Bk in the example is shown in FIGS. 9A and 9B, using the image height (millimeter) of the light spot as a parameter. FIG. 9A relates to the spot diameter in the horizontal scanning direction, and FIG. 9B relates to the spot diameter in the vertical scanning direction. As is obvious from these figures, the diameter of the light spot is respectively smaller than 50 micrometers, and is stable with respect to the defocus, both in the horizontal and vertical scanning directions.

According to the present invention, novel optical scanner and image formation apparatus can be realized. In the optical scanner according to the present invention, the deflection reflecting surface of the optical deflection unit shared for deflecting a plurality of optical beams is axially divided, energy consumption due to windage loss and noise can be reduced, and high-speed optical deflection can be performed, thereby enabling high-speed optical scanning. Since a part of the scanning image formation optical system is shared by the optical beams as a common lens, even when this lens is a resin lens, the change in the optical characteristics resulting from the temperature change becomes common to the optical beams. Therefore, out-of-color registration at the time of forming a color image can be effectively reduced. Further, by setting an angle of inclination of the oblique incident beam to a small angle, deterioration in the wave front aberration can be suppressed, thereby enabling small diameter of the optical beams. As a result, the image formation apparatus using the optical scanner of the present invention can form an "excellent image having high resolution by the light spot" of a small diameter.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanner that scans a surface of each of a plurality of latent image carriers with a corresponding light beam, comprising:
    an optical deflection unit that is rotatable and that deflects and reflects light beams, the optical deflection unit having two or more surfaces, along an axis of rotation of optical deflection unit, that deflect and reflect the light beams in different directions;
    a lens that takes-in the light beams reflected from the optical deflection unit and divides the light beams into a number of light beams equal to number of the image carrier; and
    a bending optical system corresponding to each image carrier, the bending optical system configured to guide the light beam output from the lens onto a surface of a corresponding one of the image carriers, wherein
    the light beams entering into the optical deflection unit include,
    at least one orthogonal beam that is orthogonal to the axis of rotation of the optical deflection unit, and
    at least one oblique beam that is oblique to a plane that is orthogonal to the axis of rotation of the optical deflection unit, and
    wherein the oblique beam satisfies the condition:

$$10 < 2L \cdot \tan\theta + d < 40 \text{ (millimeters)}$$

where $\theta$ is angle of incidence of the light beam with respect to the plane that is orthogonal to the axis of rotation of the optical deflection unit, d is distance between incident positions of the light beams, and L is a distance between the surfaces of the optical deflection unit and an image surface.

2. The optical scanner according to claim 1, wherein the lens is a multi-tier lens obtained by stacking a plurality of lenses in a direction parallel to the axis of rotation of the optical deflection unit.

3. The optical scanner according to claim 1, wherein a bending optical system that is nearest to the lens includes a mirror that takes-in all the light beams output from the lens, reflects a light beam corresponding to the bending optical system that is nearest to the lens, and that is transparent to remaining light beams.

4. The optical scanner according to claim 1, wherein each bending optical system includes a mirror that takes-in light beams output from the lens for the bending optical systems that are at a later stage, reflects a light beam corresponding to the bending optical system in question, and that is transparent to light beams for the bending optical systems that are at the later stage.

5. The optical scanner according to claim 1, wherein each bending optical system includes a lens that is mounted so as to be eccentric by shifting or tilting in a vertical scanning direction.

6. The optical scanner according to claim 1, wherein each bending optical system includes a lens that has at least one eccentric surface tilted in a vertical scanning direction.

7. An image forming apparatus comprising an optical scanner according to claim 1, wherein the optical deflection unit is
    a two-stage optical deflection unit that is rotatable and deflects and reflects light beams, the two-stage optical deflection unit having two surfaces, along an axis of rotation of optical deflection unit, that deflect and reflect the light beams in different directions.

8. The image forming apparatus according to claim 7, wherein
    three latent image carriers are provided corresponding to magenta, cyan, and yellow.

9. The image forming apparatus according to claim 7, wherein
    four latent image carriers are provided corresponding to magenta, cyan, yellow, and black.

10. The image forming apparatus according to claim 7, wherein the two-stage optical deflection unit comprises two polygonal mirrors separated from each other along the axis of rotation.

11. The optical scanner according to claim 1, wherein the optical deflection unit comprises a two-stage optical deflection unit that is rotatable and that deflects and reflects light beams, the two-stage optical deflection unit having two surfaces, along an axis of rotation of optical deflection unit, that deflect and reflect the light beams in different directions.

12. The optical scanner according to claim 11, wherein the light beams entering into the two-stage optical deflection unit include:
    at least one orthogonal beam that is orthogonal to the axis of rotation of the optical deflection unit, and
    at least one oblique beam that is oblique to a plane that is orthogonal to the axis of rotation of the optical deflection unit.

13. The optical scanner according to claim 11, wherein the two-stage optical deflection unit comprises two polygonal mirrors separated from each other along the axis of rotation.

* * * * *